United States Patent
Archambeau et al.

(10) Patent No.: US 7,878,649 B2
(45) Date of Patent: Feb. 1, 2011

(54) OPTICAL ELEMENT COMPRISING CELLS SEALED BY MEANS OF A LAYER OF ADHESIVE MATERIAL

(75) Inventors: Samuel Archambeau, Charenton le Pont (FR); Jerome Ballet, Charenton le Pont (FR); Jean-Paul Cano, Charenton le Pont (FR); Anthony Saugey, Charenton le Pont (FR)

(73) Assignee: Essilor International (Compagnie General d'Optique), Charenton le Pont (FR)

( * ) Notice: Subject to any disclaimer, the term of this patent is extended or adjusted under 35 U.S.C. 154(b) by 96 days.

(21) Appl. No.: 12/306,809

(22) PCT Filed: Jun. 8, 2007

(86) PCT No.: PCT/EP2007/055637

§ 371 (c)(1),
(2), (4) Date: Dec. 29, 2008

(87) PCT Pub. No.: WO2008/000607

PCT Pub. Date: Jan. 3, 2008

(65) Prior Publication Data

US 2009/0195883 A1    Aug. 6, 2009

(30) Foreign Application Priority Data

Jun. 30, 2006   (FR)  .................................. 06 05946

(51) Int. Cl.
G02C 7/02      (2006.01)
G02C 7/10      (2006.01)
G02B 3/12      (2006.01)

(52) U.S. Cl. ...................... 351/159; 351/163; 351/177; 359/665

(58) Field of Classification Search ................ 351/159, 351/41, 44
See application file for complete search history.

(56) References Cited

U.S. PATENT DOCUMENTS 5,774,273 A * 6/1998 Bornhorst ................... 359/665

(Continued)

FOREIGN PATENT DOCUMENTS

WO           03/012542           2/2003

OTHER PUBLICATIONS

Perez, Jose-Philippe, (Optique—Fondement et applications [Optics—Fundamentals and Applications], 7th edition, Paris 2004, p. 262) (English summary provided).

(Continued)

*Primary Examiner*—Jordan M. Schwartz
(74) *Attorney, Agent, or Firm*—Occhiuti Rohlicek & Tsao LLP

(57) ABSTRACT

An optical element comprises a base component (1) provided with a set of cells (10) open on a face of the component and a film (2) for sealing the cells. The film is adhesively bonded to ends (12) of separation walls (11) present between the cells. The adhesive bonding is carried out by applying a pressure adjusted so that the ends of the walls penetrate into a layer of adhesive material (3) positioned between the film and the set of cells. A refractive index value of the adhesive material is adjusted with respect to a value of the same index for the material of the ends of the walls in order to obtain an optical element which exhibits a high transparency.

27 Claims, 1 Drawing Sheet

U.S. PATENT DOCUMENTS

2003/0021005 A1* 1/2003 Liang et al. .................. 359/296
2004/0169932 A1* 9/2004 Esch et al. .................. 359/665
2006/0006336 A1* 1/2006 Cano et al. .................. 250/345
2007/0152560 A1* 7/2007 Naito et al. .................. 313/479

OTHER PUBLICATIONS

Cognard, Philippe, "Colles et adhésifs pour emballages, Généralités," 18 pages (English summary provided).

* cited by examiner

OPTICAL ELEMENT COMPRISING CELLS SEALED BY MEANS OF A LAYER OF ADHESIVE MATERIAL

CROSS-REFERENCE TO RELATED APPLICATIONS

This application is the National Stage of International Application No. PCT/EP2007/055637, filed on Jun. 8, 2007, which claims the priority of French Application No. 0605946, filed on Jun. 30, 2006. The contents of both applications are hereby incorporated by reference in their entirety.

The present invention relates to a cell-comprising optical element for which the cells are sealed using a layer of adhesive material. It also relates to a process for producing such an optical element.

BACKGROUND OF THE INVENTION

It is known to produce an optical element from a base component which is provided with a set of cells placed side by side on one of its faces and to provide the element with a desired optical property by filling the cells with an appropriate substance. This substance exhibits the desired optical property and confers it to the optical element when it is introduced inside the cells. It can be, by way of example, a substance with a variable refractive index, a dyed substance, for example for an antisolar function or a contrast-enhancing function, a polarizing substance, a photo-chromic substance or an electrochromic substance. It is then possible to use the same model of base component for producing optical elements which have different functions. The base component can then be mass produced, which makes it possible to reduce the cost price of a complete optical element.

The substance which is introduced into the cells can be a liquid or a gel. It is then necessary to subsequently seal the cells of a leaktight fashion in order to prevent leaks of the substance from occurring later on. In particular, it is known to seal the cells using a continuous film which covers the set of cells and which is adhesively bonded to ends of separation walls present between cells. To this end, the sealing film is provided with a layer of an adhesive material and is then applied onto the set of cells, the face of the film which carries the layer of adhesive material facing towards the base component.

SUMMARY OF THE INVENTION

It can be envisaged, in order to obtain an adhesive bonding which produces a more leaktight sealing of the cells, applying the film onto the set of the cells by exerting an appropriate pressure for the ends of the separation walls between the cells to penetrate into the layer of adhesive material. This penetration, or indentation, of the ends of the walls into the layer of adhesive material results from the rheological properties of the adhesive material and from the pressure which is exerted on the film when it is applied to the set of cells.

The interface between the set of cells and the layer of adhesive material then has a relief. This relief corresponds to the ends of the walls, which are indented into the layer of adhesive material and which exceed the level of the surface of the layer in a cell. It then causes significant diffraction and/or scattering of a light beam which passes through the optical element. In other words, the transparency of the optical element is damaged and is incompatible with numerous applications of the optical element. In particular, it is not compatible with an ophthalmic application.

One object of the present invention then consists in obtaining an optical element of the above type, comprising cells sealed in a leaktight fashion, which does not exhibit light scattering and/or diffraction or else for which these phenomena are reduced.

For this, the invention provides an optical element which comprises:

a base component which has a set of cells placed side by side parallel to one face of this component, the cells being open at the face of the component and being separated by walls;

a film for sealing the cells which is arranged on the face of the base component provided with the cells; and a layer of an adhesive material which is carried by a face of the sealing film facing the cells.

The optical element according to the invention is characterized in that ends of the walls for separating the cells penetrate into the layer of adhesive material and in that a material of the ends of the walls and the adhesive material have values for an optical refractive index which are substantially equal.

An optical element according to the invention thus has cells which are sealed in a leaktight fashion, given that the ends of the separation walls present between the cells are indented into the layer of adhesive material. In addition, the optical element is transparent. It can thus be used for numerous applications, in particular for ophthalmic applications. Within the meaning of the invention, the optical element is understood as being transparent when an object which is observed through this element is perceived without significant loss of contrast. In other words, an image can be formed through the optical element with a sufficient quality in terms of contrast and sharpness in particular. Thus, the diffraction and the scattering, which correspond to the dispersal of the light when the latter is limited physically at a specific point on its path ("Optique—Fondement et applications" [Optics—Fundamentals and Applications], J. P. Pérez, Dunod, 7th edition, Paris 2004, page 262), are considered as a lack of transparency.

The inventors have discovered that the light scattering and/or diffraction which is capable of being generated by the optical element is essentially generated by the walls separating the cells, because of the thickness of the latter at their ends. In other words, the dimension of the cells measured parallel to the face of the base optical component is not involved or is only slightly involved in the intensity of the light scattering and/or diffraction which may appear. According to the invention, this light scattering and/or diffraction is greatly reduced when the ends of the separation walls between the cells are embedded in an adhesive material which has a refractive index value approximatively equal to that of the ends of the walls.

Preferably, the values of the refractive index, respectively for the material of the ends of the walls and for the adhesive material, exhibit a difference of less than 0.02, indeed even of less than 0.005.

The optical element can form an optical lens, in particular an ophthalmic lens, a spectacle lens, particularly a lens for sunglasses, a mask lens, a visor, for example a helmet visor, and the like.

According to an improvement in the invention, the ends of at least some of the walls have forms which are suitable for bringing about mechanical anchoring of these walls in the layer of adhesive material. In this way, the base component and the film are more strongly assembled together, which again improves the leaktightness of the sealing of the cells.

The invention also relates to a process for producing an optical element as described above, the transparency of which is improved. Such a process comprises the following stages:

/a/ producing a base component which has a set of cells placed side by side parallel to one face of the component, the cells being opened at this face and being separated by walls;

/b/ obtaining an adhesive material which has a value of an optical refractive index which is substantially equal to a value of this index for a material present at ends of the walls for separating the cells;

/c/ depositing a layer of the adhesive material on a face of a film for sealing the cells; and /d/ applying the film onto the set of cells with the face of the film which carries the layer of adhesive material facing the cells and with a pressure which is adjusted so that the ends of the walls separating the cells penetrate into the layer of adhesive material in order to bring about the sealing of the cells.

Advantageously, the adhesive material can be obtained in step /b/ in the form of a mixture which comprises a base adhesive material and an additional substance. An amount of the additional substance in the mixture can then be adjusted in order to set the value of the refractive index of the adhesive material with respect to the value of the index for the material of the ends of the walls.

Other distinguishing features and advantages of the present invention will become apparent in the description below of nonlimiting exemplary embodiments, with reference to the appended drawings, in which:

DETAILED DESCRIPTION

For reasons of clarity, the dimensions of the elements represented are not in proportion with actual dimensions or ratios of dimensions. In addition, identical references on different figures denote identical elements. N denotes a common direction which is taken up in several figures.

Figure 1:
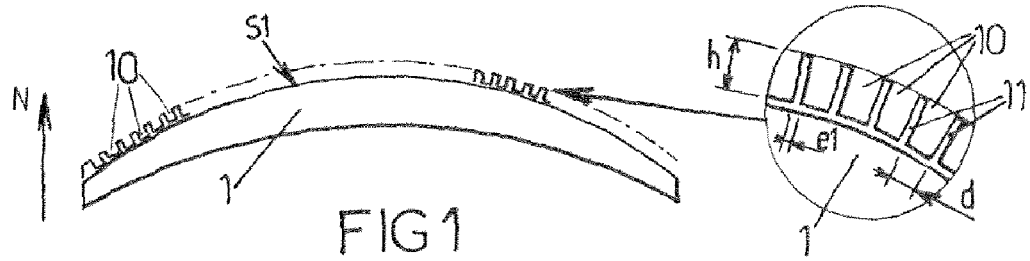
FIG. 1 is a sectional view of a base optical component which can be used to reproduce the invention.

In accordance with FIG. 1, a base optical component 1 is composed of an ophthalmic lens. This lens can be a blank for a spectacle lens, that is to say that it has not yet been cut to the dimensions of a frame for the purpose of being put together with the latter. The lens 1 can be composed of any material commonly used in the ophthalmic field, whether inorganic, organic, optionally composite, and the like. It is understood that the ophthalmic lens 1 can be replaced by an optical lens for a measuring or sighting instrument or by a spectacle lens which is not correcting for ametropia, without the use of the invention which is described subsequently being modified.

The lens 1 comprises a set of cells 10 on one of its faces, for example on the convex face, which is referenced S1. Each cell of the set 10 constitutes a cavity which is open towards the outside of the lens 1 and which is capable of receiving a substance. Two neighbouring cells are separated via a wall 11 which is oriented substantially perpendicular to the face S1. The cells 10 can have a transverse dimension d which is measured parallel to the face S1 of between 5 µm (micrometres) and 0.2 mm (millimetres), in particular approximately 20 µm. Each wall 11 can have a thickness $e_1$ of between 0.10 µm and 5 µm, in particular approximately 1 µm, parallel to the face S1 of the component 1, and a height h of between 10 and 500 µm, in particular approximately 50 µm, perpendicular to the face S1. The height h corresponds to the depth of each cell 10. It is understood that the preceding dimensions are given only by way of example and can be modified to a larger extent.

The cells 10 can be arranged in a regular or non-regular manner beside one another over the face S1. In particular, it can form a hexagonal network. The set of cells 10 can be formed directly in the lens 1 or, alternatively, it can be formed in a film which is added, for example by adhesive bonding, to the face S1 of the lens 1. In the latter case, an optical or ophthalmic lens or a spectacle lens of conventional model can be used as support for the cell-comprising film. The walls 11 between neighbouring cells can, for example, be made of a silica-based material or of an organic material comprising polycarbonate, polyethylene, polyimide, and the like.

The cells 10 can be filled with a substance having an optical property, such as a liquid or a gel which has a variable refractive index, a filtering function, a coloring function, a photochromic function, and the like. Substances based on liquid crystals, in particular for introducing a polarizing function, or electrochromic substances can also be used. The cells 10 are then filled with the substance having the optical property using a filling process which is suited to the rheological characteristics of the substance, to its wetting behaviour on the material of the walls 11 and to the dimensions of the cells 10. In particular, when the substance with the optical property is a liquid of low viscosity, the cells 10 can be filled by immersing the lens 1 in a vessel containing the substance.

Figure 2:
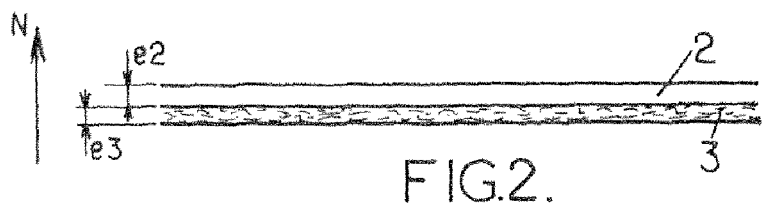
FIG. 2 is a sectional view of a sealing film intended to be applied onto the component of FIG. 1.

In accordance with FIG. 2, a continuous film comprising parallel faces 2 is covered with a layer 3 of an adhesive material on one of its faces. The film 2 can have a thickness $e_2$ of between 10 and 500 µm and the layer 3 can have a thickness $e_3$ of between 10 and 100 µm. The film 2 and the layer 3 are transparent. In addition, the material of the film 2 is selected in order to conform to the shape of the surface S1 of the lens 1, either when it is applied onto the latter or during a preliminary stage of performing the film 2. For example, the film 2 can be based on polyethylene or PET. The film 2 can additionally carry one or more coatings (not represented) on its face opposite the layer 3. Such coatings may be intended to confer additional functions on the optical element, such as, for example, an antireflective function, a dirt-repellent function, a scratch-resisting function, a hydrophobic function or a combination of these.

According to the invention, the adhesive material of the layer 3 is selected or modified so that it has an optical refractive index value which is substantially equal to the value of the same index for the material of the walls 11. More specifically, the refractive index value of the material of the layer 3 is adjusted according to that of the material which constitutes the ends of the walls 11. The inventors have found that a difference of less than 0.02, indeed even of less than 0.005, between the respective index values of the material of the ends of the walls 11 and of the adhesive material of the layer 3 makes it possible to obtain a final optical element which is compatible with the ophthalmic application.

The refractive index value of the adhesive material of the layer 3 can be adjusted in various ways. In particular, the adhesive material of the layer 3 can be obtained in the form of a mixture which comprises a base adhesive material and an additional substance. The latter has a specific refractive index value. The index value of the material of the layer 3 is then set in a known way by adjusting the respective proportions of the base adhesive material and of the additional substance in the mixture. Preferably, the additional substance is colloidal. Such a method of adjustment of the index value of the material of the layer 3 is appropriate when this value is intermediate between the values of the same index respectively for the base adhesive material and for the additional substance.

The adhesive material of the layer 3 may comprise a latex, a polyurethane, a pressure-sensitive adhesive, denoted by PSA, or a polymerizable glue. It can be deposited on the film 2 using one of the known processes, among which may be mentioned spin coating, dip coating, spreading by means of a blade, and the like.

Figure 3:
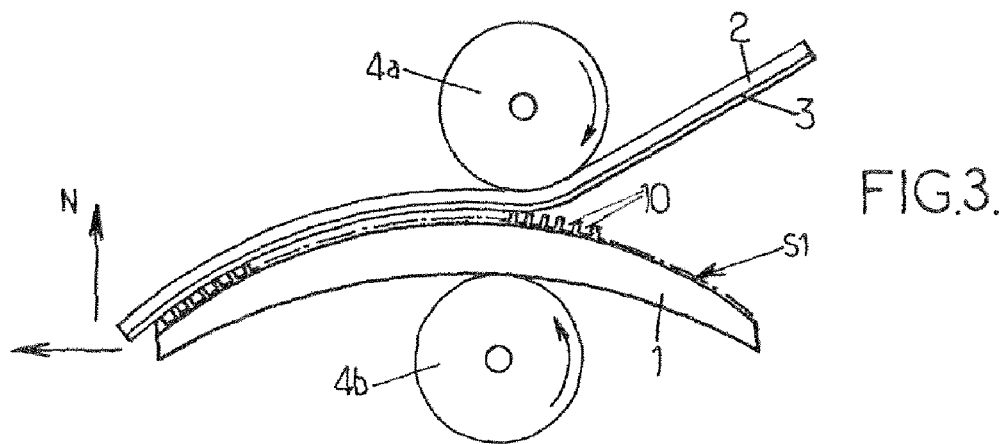
FIG. 3 illustrates a specific procedure for applying the film of FIG. 2 onto the component of FIG. 1.

The film 2 provided with the layer 3 can then be put together with the lens 1 by introducing them simultaneously into a casting unit (FIG. 3). The direction N which is given in FIGS. 1 to 3 indicates the orientations of the lens 1 and of the film 2 during their passage through the casting unit. Preferably, the direction N is oriented upwards, in order to prevent the substance with the optical property which is present in the cells 10 from flowing out of the latter. The casting unit essentially comprises two rotating rolls 4a and 4b which draw the lens 1 and film 2 while compressing them against one another with a controlled pressure. Advantageously, the rolls 4a and 4b are composed of a flexible material and the compression of the film 2 against the face S1 of the lens 1 is controlled by adjusting the distance between the axes of rotation of the two rolls.

Figures 4A, 4B:
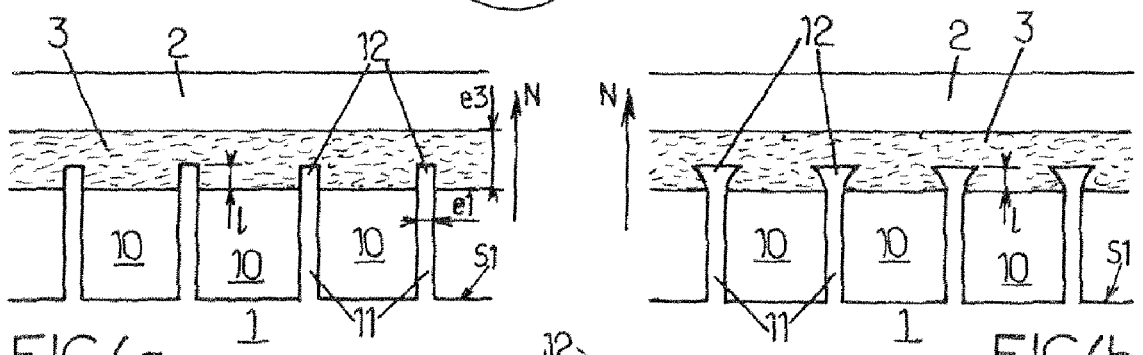
FIGS. 4a-4c are enlarged sectional views of respective parts of three optical elements produced according to the invention.
Figure 4C:
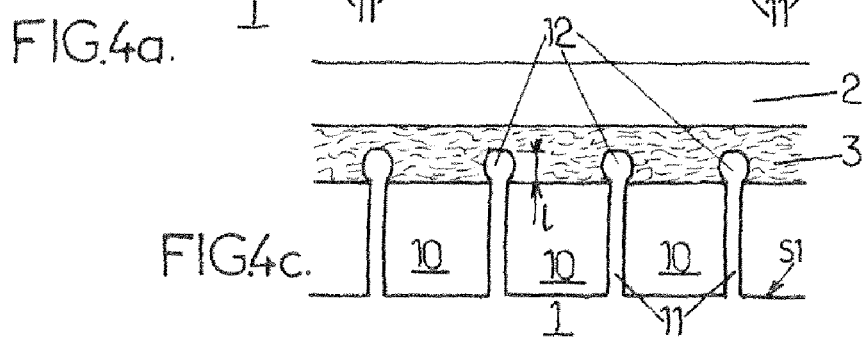

Given the thinness $e_1$ and the stiffness of the walls 11, the ends of the walls 11 which are situated between the openings of the cells 10 penetrate into the layer of adhesive material 3 when the film 2 is applied against the lens 1. FIGS. 4a-4c represent the assembly which is obtained for various forms of the walls 11. Depending on the application pressure and the rheological characteristics of the material of the layer 3, the ends of the walls 11, referenced 12 in FIGS. 4a-4c, can penetrate into a part of the layer 3 which corresponds to a fraction of the thickness $e_3$ of between 10% and 100%. In other words, the ends 12 of the walls 11 which are located inside the layer 3 on conclusion of the assembling can have a length of greater than $0.10 \times e_3$, measured according to the direction N. This length is recorded as l in the figures and extends from the surface of the layer 3 opposite the film 2. Because of the adhesive behaviour of the material of the layer 3, the film 2 is then retained on the face S1 of the lens 1 via the walls 11. By virtue of the length l of the ends 12 over which adhesion takes place, a stronger assembly is obtained as the surface area for adhesive bonding over the set of the cells 10 is greater. Leaktight and permanent sealing of the cells 10 is thus produced, by which the substance with the optical property is enclosed in the cells.

FIGS. 4b and 4c illustrate embodiments of the invention for which at least some of the ends 12 of the walls 11 have variable thicknesses, measured parallel to the face S1 of the lens 1. They exhibit a maximum thickness located inside the layer of adhesive material 3. In this way, mechanical anchoring of the walls 11 in the layer of adhesive material 3 is bought about when the film 2 is applied onto the set of cells 10, in addition to the adhesive bonding which results in the adhesion of the layer 3 to the ends 12. The assembly obtained is then even stronger.

When the film 2 is based on PET and the layer 3 is based on latex, the lens 1 provided with the sealing film 2 can be heated after the assembling step at approximately 75° C. for a time of approximately 30 minutes. The structure of the layer 3 with the ends 12 which penetrate into the latter is then definitively fixed.

By virtue of the adjustment of the refractive index value of the layer 3 with respect to that of the ends of walls 12, the optical element which is obtained exhibits the high transparency without significant scattering. This transparency is mainly due to the fact that the layer 3 and the ends 12 indented into the latter exhibit an overall homogeneity as regards the optical refractive index. In this way, each wall end 12 does not generate a secondary light wave when a primary light beam passes through the lens 1.

It is specified that this improvement in the transparency of the optical element is essentially independent of the substance possessing an optical property which is present in the cells. It is in particular independent of the value of the refractive index for this substance. For this reason, the invention can be employed for a great variety of optical elements which differ in the nature of the substance having the optical properties which is present in the cells.

It is understood that numerous adaptations may be introduced into the embodiments of the invention which have been described in detail above while retaining at least some of the advantages cited. In addition, it should be remembered that the dimensions and the materials which have been indicated have been indicated only by way of illustration. They can thus be varied, in particular in order to produce optical elements suited to particular uses.

The invention claimed is:

1. Optical element comprising:
 a base component having a set of cells placed side by side parallel to a face of the component, the cells being open at said face and being separated by walls;
 a film for sealing the cells arranged on the face of the base component provided with the cells; and
 a layer of an adhesive material carried by a face of the sealing film which faces the cells,
wherein the ends of the walls separating the cells penetrate into the layer of adhesive material to bring about the sealing of the cells, and wherein the adhesive material comprises a mixture of a base adhesive material and of an additional substance, the refractive index value of the adhesive material being intermediate between the respective refractive index values of said base adhesive material and of said additional substance, and an amount of the additional substance in the mixture being adapted so that a material of said ends of the walls and the adhesive material have values for an optical refractive index which are substantially equal.

2. Element according to claim 1, in which the values of the refractive index respectively for the material of the ends of the walls and for the adhesive material exhibit a difference of less than 0.02.

3. Element according to claim 2, in which the difference between the values of the refractive index respectively for the material of the ends of the walls and for the adhesive material is less than 0.005.

4. Element according to claim 1, in which the walls have thicknesses of between 0.10 μm and 5 μm, measured parallel to the face of the base component.

5. Element according to claim 1, in which the ends of at least some of the walls have shapes adjusted in order to bring about mechanical anchoring of said walls in the layer of adhesive material.

6. Element according to claim 5, in which at least some of the ends of walls have variable thicknesses, measured parallel to the face of the base component, with a maximum thickness located inside the layer of adhesive material.

7. Element according to claim 1, in which the additional substance is colloidal.

8. Element according to claim 1, in which the adhesive material comprises a latex, a polyurethane, a pressure-sensitive adhesive or a polymerizable glue.

9. Element according to claim 1, in which the sealing film is based on polyethylene.

10. Element according to claim 1, in which the cells are filled with a substance having an optical property.

11. Element according to claim 1, forming an optical lens.

12. Element according to claim 11, forming an ophthalmic lens.

13. Element according to claim 1, forming a spectacle lens.

14. Process for producing an optical element comprising the following stages:
- /a/ producing a base component having a set of cells placed side by side parallel to a face of said component, the cells being opened at said face and being separated by walls;
- /b/ obtaining an adhesive material having a value of an optical refractive index which is substantially equal to a value of said index for a material present at ends of the walls separating the cells;
- /c/ depositing a layer of said adhesive material on a face of a film for sealing the cells; and
- /d/ applying the film onto the set of cells with the face of said film which carries the layer of adhesive material facing the cells and with a pressure adjusted so that the ends of the walls separating the cells penetrate into the layer of adhesive material in order to bring about the sealing of the cells wherein the adhesive material is obtained in step /b/ in the form of a mixture comprising a base adhesive material and an additional substance, an amount of the additional substance in the mixture being adjusted in order to set the refractive index value of the adhesive material with respect to the value of said index for the material of the ends of the walls.

15. Process according to claim 14, wherein step /b/ is carried out so that the values of the refractive index respectively for the material of the ends of the walls and for the adhesive material exhibit a difference of less than 0.02.

16. Process according to claim 15, wherein step /b/ is carried out so that the difference between the values of the refractive index respectively for the material of the ends of the walls and for the adhesive material is less than 0.005.

17. Process according to claim 14, wherein the base component is produced in step /a/ so that the walls have thicknesses of between 0.10 µm and 5 µm measured parallel to the face of the base component.

18. Process according to claim 14, wherein the base component is produced in step /a/ so that the ends of at least some of the walls have shapes suitable for bringing about mechanical anchoring of said walls in the layer of adhesive material on conclusion of step /d/.

19. Process according to claim 18, wherein the base component is produced in step /a/ so that at least some of the ends of the walls have variable thicknesses, measured parallel to the face of base component, with a maximum thickness located inside the layer of adhesive material on conclusion of step /d/.

20. Process according to claim 14, wherein the additional substance is colloidal.

21. Process according to claim 14, wherein the adhesive material obtained in step /b/ comprises a latex, a polyurethane, a pressure-sensitive adhesive or a polymerizable glue.

22. Process according to claim 14, wherein the sealing film used in steps /c/ and /d/ is based on polyethylene.

23. Process according to claim 14, wherein step /d/ is carried out by introducing the base component with the sealing film into a casting unit.

24. Process according to claim 14, wherein step /a/ additionally comprises filling the cells with a substance having an optical property.

25. Process according to claim 14, wherein the base component produced in step /a/ comprises an optical lens.

26. Process according to claim 25, wherein the base component produced in step /a/ comprises an ophthalmic lens.

27. Process according to claim 14, wherein the base optical component comprises a spectacle lens.

* * * * *